(12) United States Patent
Supino (10) Patent No.: US 10,366,718 B1
(45) Date of Patent: Jul. 30, 2019

(54) HARD DISK SERVO CONTROL ADAPTIVE NOTCH FILTER USING A RECURSIVE LEAST SQUARES PROCESSOR

(71) Applicant: Seagate Technology LLC, Cupertino, CA (US)

(72) Inventor: Lou Supino, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/933,726

(22) Filed: Mar. 23, 2018

(51) Int. Cl.
| | |
|---|---|
| *G11B 5/09* | (2006.01) |
| *G11B 5/596* | (2006.01) |
| *G11B 5/48* | (2006.01) |
| *G11B 5/012* | (2006.01) |

(52) U.S. Cl.
CPC .......... *G11B 5/59688* (2013.01); *G11B 5/012* (2013.01); *G11B 5/4886* (2013.01); *G11B 5/59627* (2013.01)

(58) Field of Classification Search
None
See application file for complete search history.

(56) References Cited

U.S. PATENT DOCUMENTS

| | | | | |
|---|---|---|---|---|
| 4,300,226 | A * | 11/1981 | Barnette | G11B 7/0914 |
| | | | | 250/201.5 |
| 5,377,060 | A * | 12/1994 | Nigam | G11B 5/4806 |
| | | | | 360/98.02 |
| 5,768,228 | A * | 6/1998 | Bates | G11B 7/08529 |
| | | | | 369/44.28 |
| 5,875,162 | A * | 2/1999 | Baba | G11B 7/08505 |
| | | | | 369/44.29 |
| 6,417,982 | B1 | 7/2002 | Ottesen et al. | |
| 6,574,065 | B1 * | 6/2003 | Sri-Jayantha | G11B 5/59605 |
| | | | | 360/75 |
| 6,636,376 | B1 * | 10/2003 | Ho | G11B 5/59688 |
| | | | | 360/77.02 |
| 6,643,080 | B1 * | 11/2003 | Goodner, III | G11B 21/02 |
| | | | | 360/31 |
| 9,202,496 | B2 | 12/2015 | Supino | |
| 9,460,744 | B1 | 10/2016 | Gaub et al. | |
| 2002/0012191 | A1 * | 1/2002 | Ho | G11B 5/59627 |
| | | | | 360/77.04 |
| 2002/0093754 | A1 * | 7/2002 | Zhang | G11B 5/59611 |
| | | | | 360/77.04 |
| 2003/0133212 | A1 * | 7/2003 | Fulkerson | G11B 5/59622 |
| | | | | 360/25 |

(Continued)

OTHER PUBLICATIONS

Albu et al., "Implementation of (Normalised) RLS Lattice on Virtex", Field-Programmable Logic and Applications 11th International Conference, Aug. 27-29, 2001, pp. 91-100.

*Primary Examiner* — Peter Vincent Agustin
(74) *Attorney, Agent, or Firm* — Hollingsworth Davis, LLC (57) ABSTRACT

A signal is monitored that provides an indicator of disturbance affecting a hard disk drive. In response to determining that the indicator of the disturbance satisfies a threshold, a lattice recursive least squares computation is applied to the signal to determine at least one notch frequency. A notch filter is formed using the at least one notch frequency. The notch filter is used by a servo controller loop that positions a read/write head over a disk of the hard disk drive. The notch filter is applied to the servo control loop for subsequent positioning of the read/write head.

20 Claims, 10 Drawing Sheets

(56) References Cited

U.S. PATENT DOCUMENTS

| | | | |
|---|---|---|---|
| 2003/0206365 A1* | 11/2003 | Ho | G11B 5/5556 |
| | | | 360/78.04 |
| 2004/0105294 A1* | 6/2004 | Kisaka | G11B 5/59622 |
| | | | 365/145 |
| 2007/0019321 A1 | 1/2007 | Kim et al. | |
| 2009/0219641 A1* | 9/2009 | Harmer | G11B 5/59627 |
| | | | 360/71 |
| 2010/0312365 A1* | 12/2010 | Levin | G05B 19/41835 |
| | | | 700/37 |
| 2011/0058276 A1* | 3/2011 | Uchida | G11B 5/59622 |
| | | | 360/77.07 |

* cited by examiner

```
// Compute the a priori prediction error of the
// Recursive Parameter Estimation Algorithm prediction_error = 2*(PoleDamp-ZeroDamp)*
            AdaptFreq*FilterState[0]+
            (ZeroDamp^2-PoleDamp^2)*FilterState[1] +
            FilteredDisturbanceSignal;

// Compute the partial derivative vector:
// psi = -d_error/d_AdaptFreq

Psi=2*(ZeroDamp*fs_Gamma[0] - PoleDamp*Phi[0]);

//Frequency Parameter update
Temp2 =Psi*K*Psi;
Temp = lambda+Temp2;
Temp1 = AdaptFreq;

AdaptFreq = AdaptFreq +(K*Psi* prediction_error)/
            (Temp);   // Freq param K=(K - ((K*Temp2)/(Temp)))/(lambda);    // RPEM gain term // Reflection Coefficient Limit Check also serves
// as a stability check and speeds up adaptation
      if ((AdaptFreq) >= AdaptFreqAdaptHighLimit)
      {
          AdaptFreq = Temp1;   //
      }
      else if ((AdaptFreq)< AdaptFreqAdaptLowLimit)
      {
          AdaptFreq = Temp1;   //
      }

(C)Copyright 2018, Seagate Technology, LLC
```

311 — partial derivative block
312 — frequency parameter update block
313 — reflection coefficient limit check block

321 {
```
//a posteriori prediction error ebar = 2*(PoleDamp-ZeroDamp)*AdaptFreq*
        FilterState[0]+(ZeroDamp^2-PoleDamp^2)*
        FilterState[1] + FilteredDisturbanceSignal;
```
}

322 {
```
// Update the state vectors
Temp=FilterState[0];
FilterState[0] = 2*PoleDamp*AdaptFreq*FilterState[0]-
            (PoleDamp^2)*FilterState[1]+
            FilteredDisturbanceSignal;
FilterState[1] = Temp;

// Update the derivative state vectors

Temp=Phi[0];
Phi[0] = 2*PoleDamp*AdaptFreq*Phi[0]-
        (PoleDamp^2)*Phi[1] + ebar; //den
Phi[1] = Temp;

Temp=Gamma[0];
Gamma[0]=2*ZeroDamp*AdaptFreq*Gamma[0] -
        (ZeroDamp^2)*Gamma[1] + ebar; //num
Gamma[1]=Temp;

// Update the filter pole damping(PoleDamp)
PoleDamp = PoleDamp_end-
        (PoleDamp_end-PoleDamp)*PoleDamp_rate;

// Update the RPEM forgetting factor (lambda)
lambda = lamba_end - (lambda_end -lambda)*lambda_rate;
```
}

*(C)Copyright 2018, Seagate Technology, LLC*

HARD DISK SERVO CONTROL ADAPTIVE NOTCH FILTER USING A RECURSIVE LEAST SQUARES PROCESSOR

SUMMARY

Various embodiments described herein are generally directed to methods, systems, and apparatuses utilizing an adaptive notch filter using a recursive least squares processor. In one embodiment, a signal is monitored that provides an indicator of disturbance affecting a hard disk drive. In response to determining that the indicator of the disturbance satisfies a threshold, a lattice recursive least squares computation is applied to the signal to determine at least one notch frequency. A notch filter is formed using the at least one notch frequency. The notch filter is used by a servo controller loop that positions a read/write head over a disk of the hard disk drive. The notch filter is applied to the servo control loop for subsequent positioning of the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

This disclosure relates to servo control of hard disk drives (HDDs). Generally, as areal density of HDDs increase, servo control of the heads that read and write tracks becomes more challenging. One way to increase areal density is to reduce track width and track pitch. With these smaller and more densely packed tracks, servo systems have increasingly smaller margins for error. Operations such as writing may be particularly sensitive to tracking errors, as this could lead to loss of data on adjacent tracks.

One way to increase accuracy of hard disk tracking is to utilize a multiple-stage actuation system. For example, dual-stage controllers drive a voice-coil motor (VCM) for coarse positioning of the read/write heads along with a microactuator that provides fine positioning for each individual head. While a multiple-stage actuation system can provide significant servo performance improvement over a single-stage actuator (e.g., VCM alone), such systems can be more complicated to implement. For example, the servo control systems may need to detect and filter relatively higher frequency disturbances that can affect the microactuator performance compared to a single-stage controller.

With the ever-increasing mechanical complexity of the VCM and microactuator in today's HDDs over the past five years, the growth in notch and other stabilization features has grown exponentially. Today's products utilize conservative control systems (using a large number of notch filters) to ensure stability over a wide temperature range and for many millions of units made by multiple vendors. The use of these filters comes at the expense of drive operational vibration performance due to the cost (e.g., phase loss) of these features.

In the present disclosure, a servo control system is described that can utilize fewer notch filters yet achieve good disturbance rejections. The notch filters are adaptive, meaning that they can change cutoff frequencies and gain dynamically in response to real-time disturbance detection. For example, on one drive system, ten sub-Nyquist digital-to-analog converter (DAC) notches were removed and replaced with three adaptive DAC notches, if needed. This resulted in reduced sensitivity to peaking, which in turn provided improved cabinet operational vibration performance. Cabinet tests with the adaptive filters show performance increased from 75% to 85% throughput by replacing the ten large notches with three adaptive notches.

Figure 1:
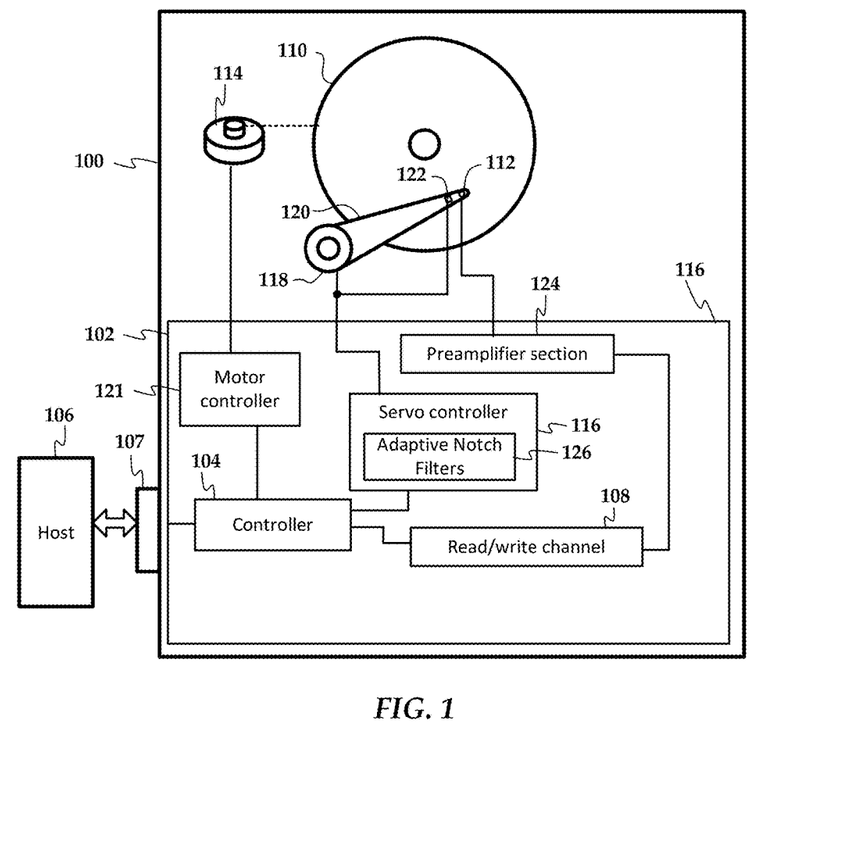
FIG. 1 is a block diagram of an apparatus according to an example embodiment.

Notch filtering may be used in any type of control system, although for purposes of this disclosure, embodiments are shown being used in hard disk servo controllers. In FIG. 1, a block diagram shows a hard disk drive apparatus 100 that uses an adaptive notch processor according to an example embodiment. The apparatus 100 includes circuitry 102 that facilitates reading from and writing to a recording medium, e.g., one or more magnetic disks 110. The circuitry 102 includes a system controller 104 that facilitates, among other things, communication with a host device 106 via a host interface 107. The host device 106 may include any electronic device that can be communicatively coupled to communicate with the circuitry 102, e.g., a general-purpose computer, a factory test bench, etc.

The system controller 104 may include any combination of custom logic circuits, application specific integrated circuits (ASICs), general-purpose central processing unit (CPU), interface circuits, and may utilize instructions stored as firmware and/or software. The system controller 104 communicates with one or more read/write heads 112 via a read/write channel 108. The system controller 104 may, among other things, determine a location on the disk 110 for data to be stored or retrieved, move the read/write head 112 to the locations (tracks) on the disk 110, read or write the data via the read/write channel 108, correct errors, transfer the data to/from the host 106, etc.

The read/write channel 108 converts data between the digital signals processed by the system controller 104 and the analog signals conducted through read/write head 112. The read/write channels 108 also provide servo data read from the disk(s) 110 to servo controller 116. The servo controller 116 use these signals to drive a VCM actuator 118 that rotates an arm 120 upon which the read/write head 112 is mounted. The head 112 is moved radially across different tracks of the disk 110 by the VCM actuator 118 while a spindle motor 114 rotates the disk 110. The controller 104 controls the spindle motor 114 by way of a motor controller 121.

The servo controllers 116 also control a microactuator 122 that provides fine position control for the read/write head 112. The microactuator 122 may be formed from, e.g., piezoelectric materials, and may be mounted on the arms 122 proximate the read/write heads 112. The servo controller 116 may use a single-stage or dual-stage, closed-loop controller. The servo controller 116 may utilize a disturbance observer, such as a module that analyzes position error signals and/or a decoupled vibration sensor such as an accelerometer.

During write operations, the read/write channel 108 provides analog signals that are delivered to the read/write head 112 by way of a preamplifier section 124. The preamplifier section 124 amplifies and conditions the write signals sent to a write coil of the read/write head 112. During read operations, the read/write head 112 transmits signals to the preamplifier section 124, which conditions the analog signals before sending the signals to the read/write channel 108.

The servo controller 116 includes adaptive notch filters 126 used to aid the servo controller 116 in adapting to different operating conditions. The adaptive notch filters 126 place notches (e.g., notch filters affecting feedback signals) as needed, in near-real-time without disturbing the operation of the apparatus 100. Additionally, the depth and width of the filtering can also be adjusted via the adaptive notch filters 126. There is no need to have, for example, four notch filters in one area when one adaptive notch would do, if it could be placed precisely. For example, one mode in an existing drive was found to occur in the 10 kHz-15 kHz range due to temperature variations and design. An implementation/demonstration of the notch filter processing was to use one narrow notch to replace four wide/deep notches in this area.

The algorithms used by the notch filters 126 adapt in roughly 10-50 servo samples, due to the use of a frequency estimator that will be described in more detail below. One existing algorithm is tuned in the factory at two temperature points. During drive operation, the notches can move via thermal adaptive notch processor using a linear fit of coefficients versus temperature of the $z^{-1}$ coefficients. This allows the notch to move in narrow frequency ranges before becoming distorted and ineffective. Additionally multiple notches can be used to cover wide ranges due to the variability of the population in manufacturing and temperature.

Other notch filter implementations require taking the drive offline to identify the mechanical modes and placing the appropriate notches. It has been found that such algorithms do not function well in low signal-to-noise ratio (SNR) environments and the use of least means squares (LMS) adaptation may lead to the frequency detection being biased in the presence of multiple modes. Other solutions make minor improvements in the biasing problem but at the cost of additional convergence time for the algorithms.

The notch filter frequency estimators described herein overcome shortcomings by using a multi-step recursive least-squares (RLS) processor. In addition to varying the shape of the notch, the lattice frequency detector gives accurate frequency detection when multiple modes are present, and does so in a very short time (10-50 servo samples).

In general, the processor includes a disturbance detector, a lattice-based frequency identifier and an adaptive notch filter. The disturbance detector may monitor a band-limited position error signal (PES) and compare a cumulative value (e.g., average amplitude absolute value within a moving time window) of the PES to a threshold. If the PES cumulative value is above a predetermined threshold, the lattice based frequency identifier is activated. Reflection coefficients of the lattice based frequency identifier are adapted using an enhanced recursive parameter identification method. The reflection coefficient contains the frequency information, which is passed to the HDD notch filter, which in turn stabilizes the modes of the disturbances. The frequency identifier can be replaced with FFT algorithms, although those may be too slow to provide adaptive notch placement before instability occurs.

Figure 2:
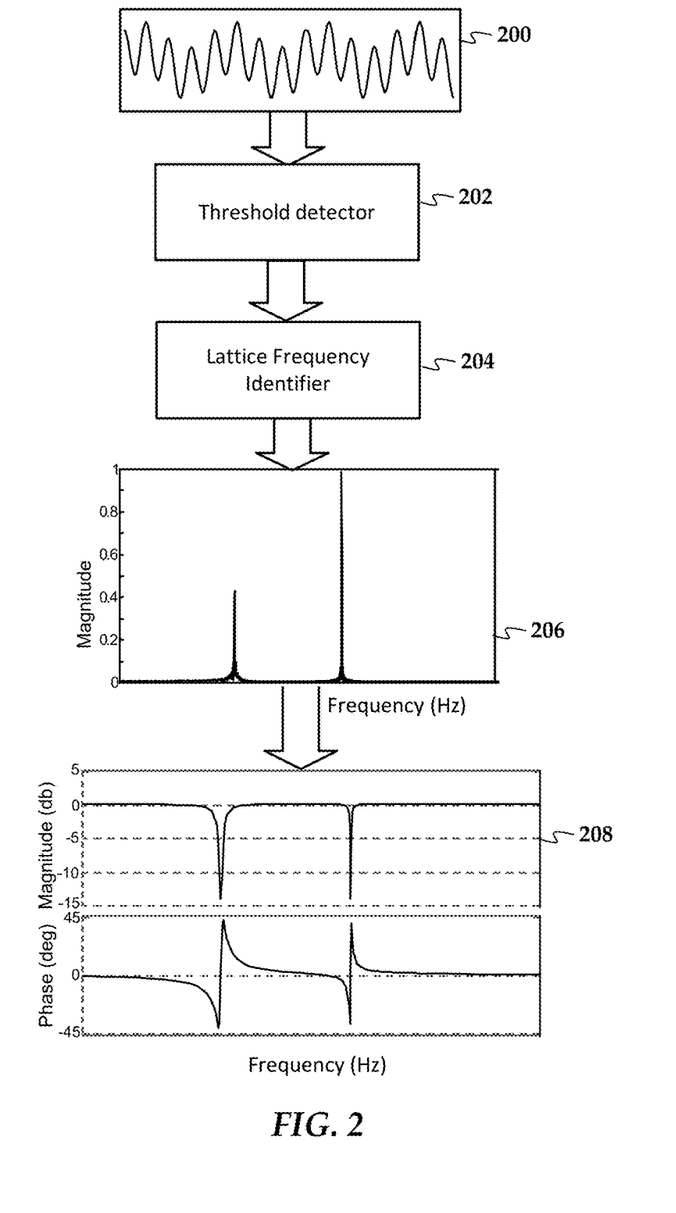
FIG. 2 is a diagram illustrating a lattice-based frequency identifier according to an example embodiment.

In reference now to FIG. 2, a diagram illustrates a lattice-based frequency identifier according to an example embodiment. The apparatus monitors samples a signal 200 that may exhibit indicators of a disturbance or instability. The signal 200 may be a position error signal (PES) read from servo marks on the disk, output of a disturbance estimator, and/or output of sensors such as accelerometers. The signal 200 is processed in real time by a threshold detector 202, e.g., during track following or other steady-state mode. The threshold detector 202 monitors the signal 200 and determines whether the magnitude of the signal exceeds a threshold. This may involve, for example, summing absolute values of the samples of the signal 200 over a moving time window. If this sum exceeds a predetermined (or adaptive) threshold, then a lattice frequency identifier 204 is utilized.

The threshold detector 202 may bandwidth limit the signal 200 components used to determine the threshold, e.g., so that only disturbances in a frequency range of interest will trigger the lattice frequency identifier 204. The lattice frequency identifier 204 may start calculations after being triggered by the threshold detector, although in some cases the lattice frequency identifier 204 may already be running when the trigger occurs, e.g., running in a diagnostics mode.

The lattice frequency identifier 204 utilizes a multi-step RLS processor. Generally, an RLS filter processor minimizes a cost function by appropriately selecting the filter coefficients and updating the filter coefficients as new data arrives. The lattice RLS (LRLS) is based on a posteriori errors (as opposed to a priori errors) and as a result uses fewer arithmetic calculations as opposed to a standard RLS. The output of the lattice frequency identifier 204 is shown in graph 206, which shows an estimate of the disturbance's frequency profile. This is used to form a notch filter, as shown in the Bode plot 208.

Figure 3A:
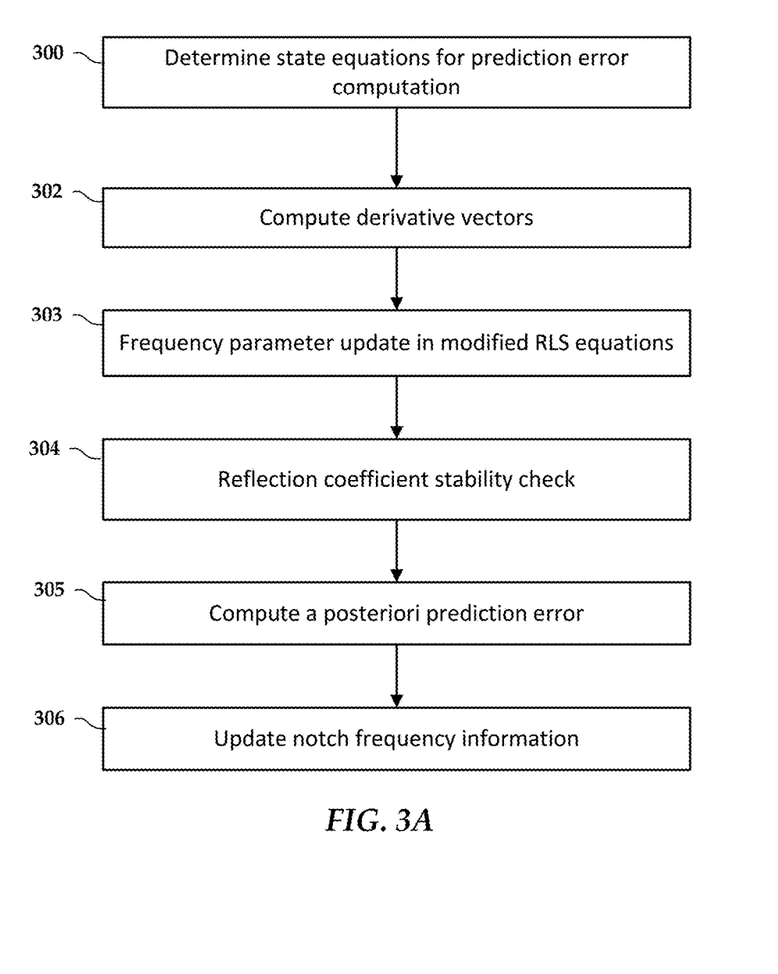
FIG. 3A is a flowchart showing an example recursive least squares computation according to an example embodiment.
Figure 3B:
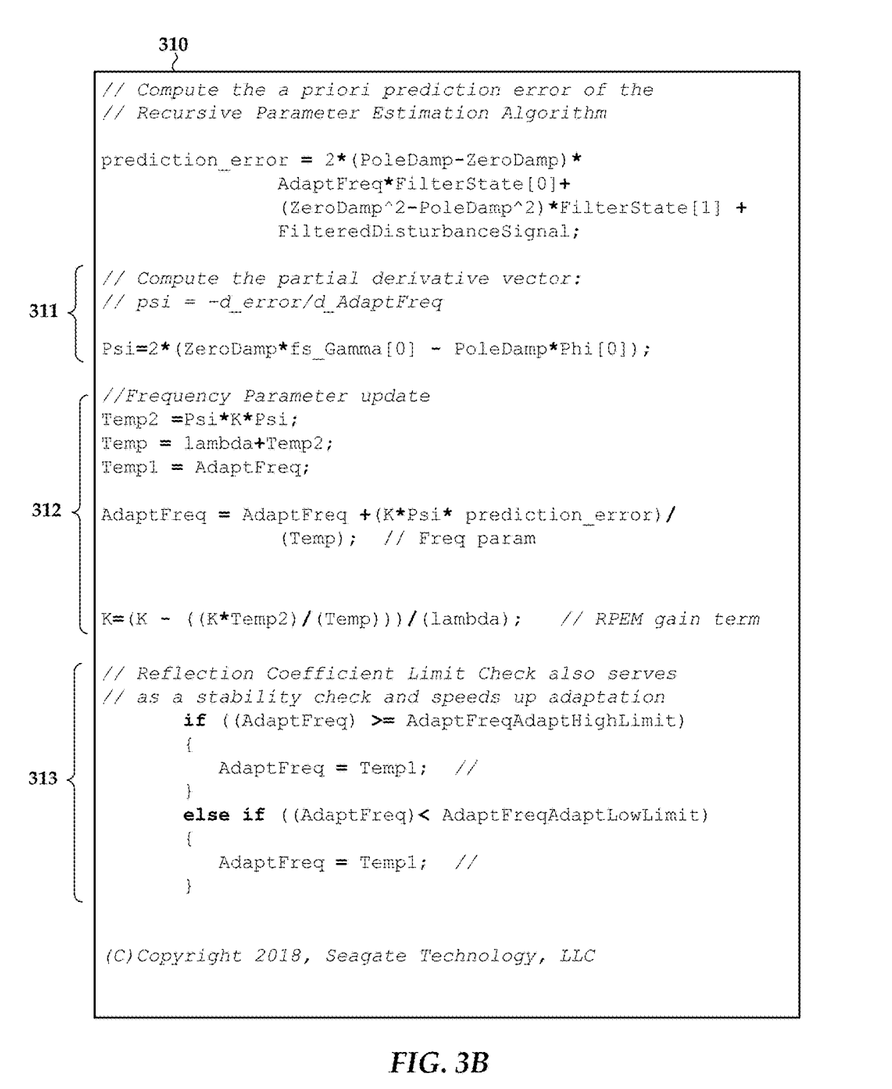
FIGS. 3B and 3C are pseudocode listings showing example implementation details of the method shown in FIG. 3A.
Figure 3C:
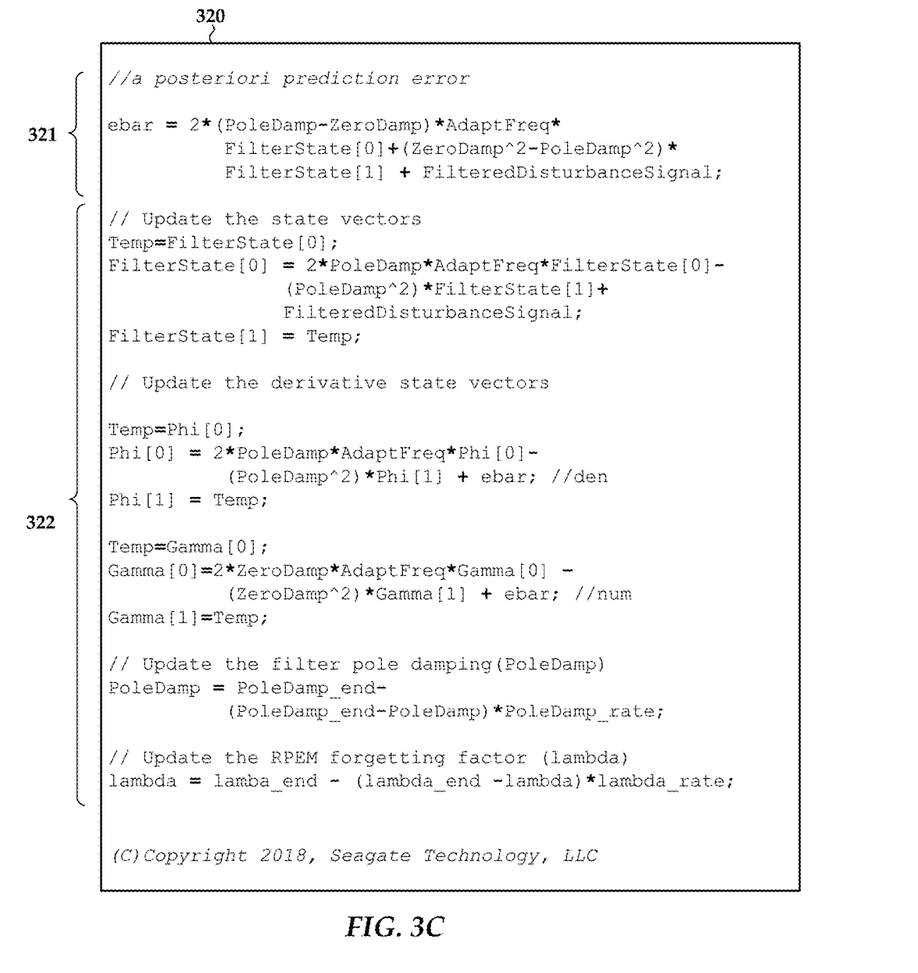

In FIG. 3A, a flowchart shows an example of the LRLS processing according to an example embodiment. In FIGS. 3B and 3C, code listings 310, 320, 330 show details of the LRLS procedure implemented in pseudocode according to an example embodiment. As seen in the flowchart of FIG. 3, state equations for prediction error computation are determined 300. For each sample of data, the partial derivative vectors of the frequencies to which the algorithm are trying to adapt are computed 302. An example of this is shown in the code segment 311 seen in FIG. 3B. The frequency parameters are then updated 303 in the modified RLS equations, e.g., as seen in the code segment 312 of FIG. 3B. A stability check 304 is performed for the reflection coefficient, which holds the frequency information used by the adaptive notch filter. This is as seen in the code segment 313 of FIG. 3B. An a posteriori error prediction is performed 305, e.g., as seen in the code segment 321 of FIG. 3C. The notch frequency information is updated 306, e.g., as seen in the code segment 322 of FIG. 3C.

Figure 4:
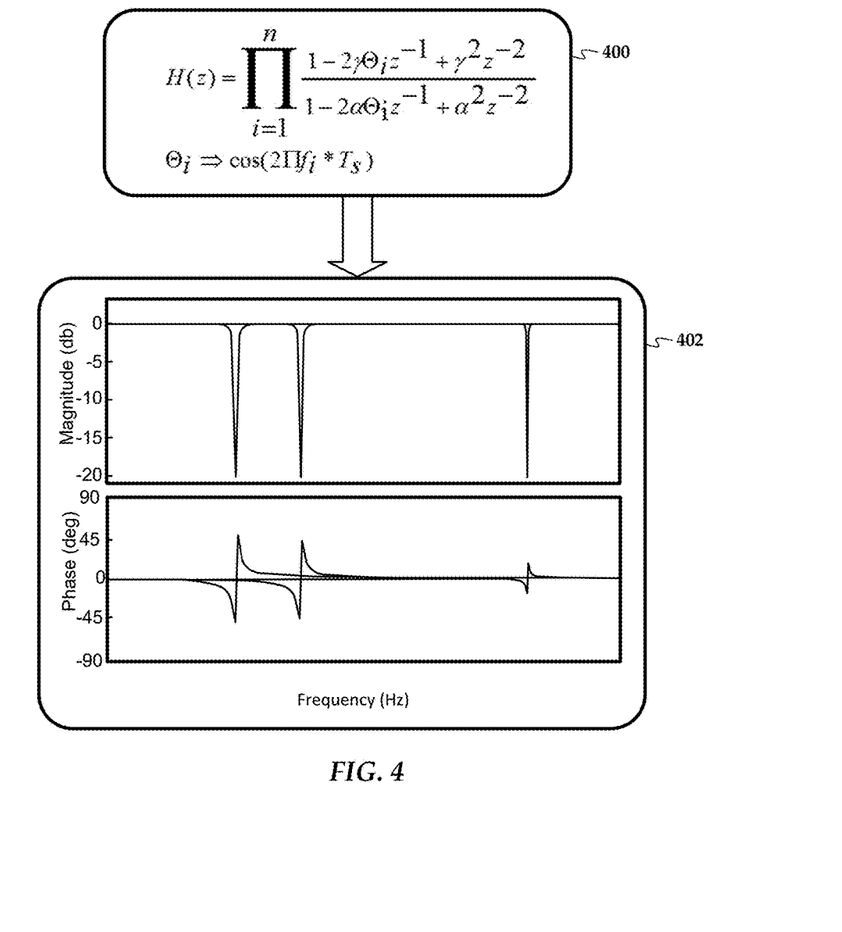
FIG. 4 a block diagram showing details of lattice based frequency identification according to an example embodiment.
Figure 5:
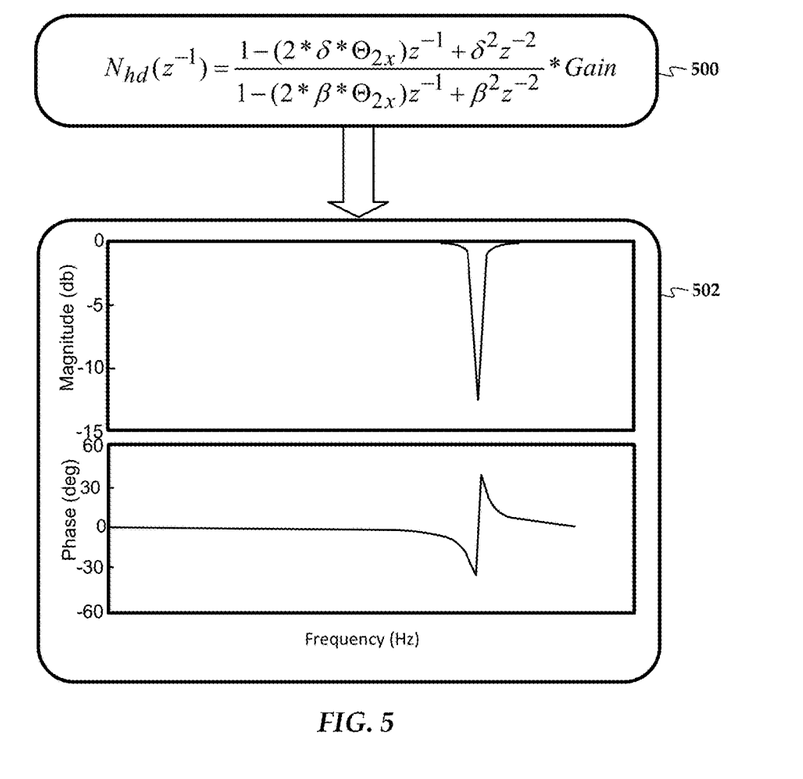
FIG. 5 shows adaptation of a reflection coefficient according to an example embodiment.

In FIG. 4, a diagram shows details of the lattice based frequency identification according to an example embodiment. Block 400 represents the LRLS used to find the filter parameters as indicated in the Bode plot 402. Note the Θ in block 400 is the reflection coefficient used to obtain the center frequency of the notches shown in the plot 402. In FIG. 5, a diagram shows an adapted reflection coefficient Θ converted to 2× multi-rate, providing the multi-rate digital-to-analog converter (DAC) notch shown in Bode plot 502. This 2× multi-rate conversion is specific to a particular application, where the adaptive filter uses a different sampling rate than the data sampling rate, and therefore a conversion is used to achieve the desired notch frequencies used by the servo controller. After this adaptation, the notch filter is applied causing the PES (or other measure of disturbance) to fall below the threshold and complete the adaptation of the notch filter.

Figure 6:
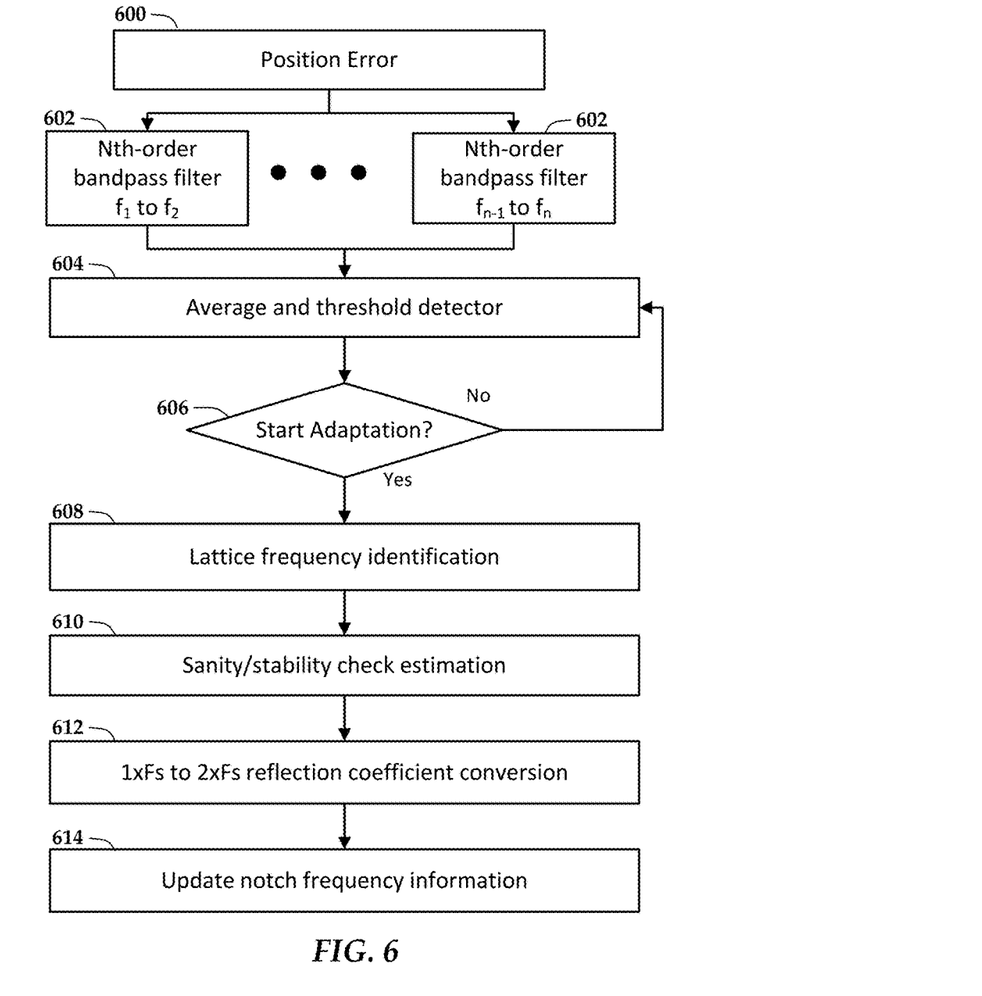
FIG. 6 is a flowchart showing a procedure according to an example embodiment.

In FIG. 6, a flowchart shows an adaptive notch procedure according to another example embodiment. Position error is measured 600 starting, e.g., once a head enters track following mode. The position error is passed through one or more filters 602, in this case bandpass filters. The filter order (e.g., third order, fourth order) and high/low cutoff frequencies may be user selectable such that they can be tailored for particular drive configurations and expected operating conditions. The filtered position error is processed 604 to determine averages (or other combination) which can be used to test for threshold values. This processing 604 may have user configurable parameters, such as number of samples to combine (e.g., size of time window) as well as threshold values that determine start (and stop) of adaptive filtering.

If the threshold is exceeded, then decision block 606 returns 'yes,' and lattice frequency identification 608 begins. Once the identification 608 has converged on a solution, a sanity/stability check 610 is performed. The stability check involves determining the coefficients will keep the algorithm stable (e.g., code segment 313 in FIG. 3B). This may involve, for example, ensuring that the notch frequencies are within a particular range, e.g., a range determined based on known resonance characteristics of the target device. A conversion 612 is also performed as shown in FIG. 6, and the notch frequency information is updated 614. Note that this procedure may be interrupted at any point by the drive leaving track following mode.

Figure 7:
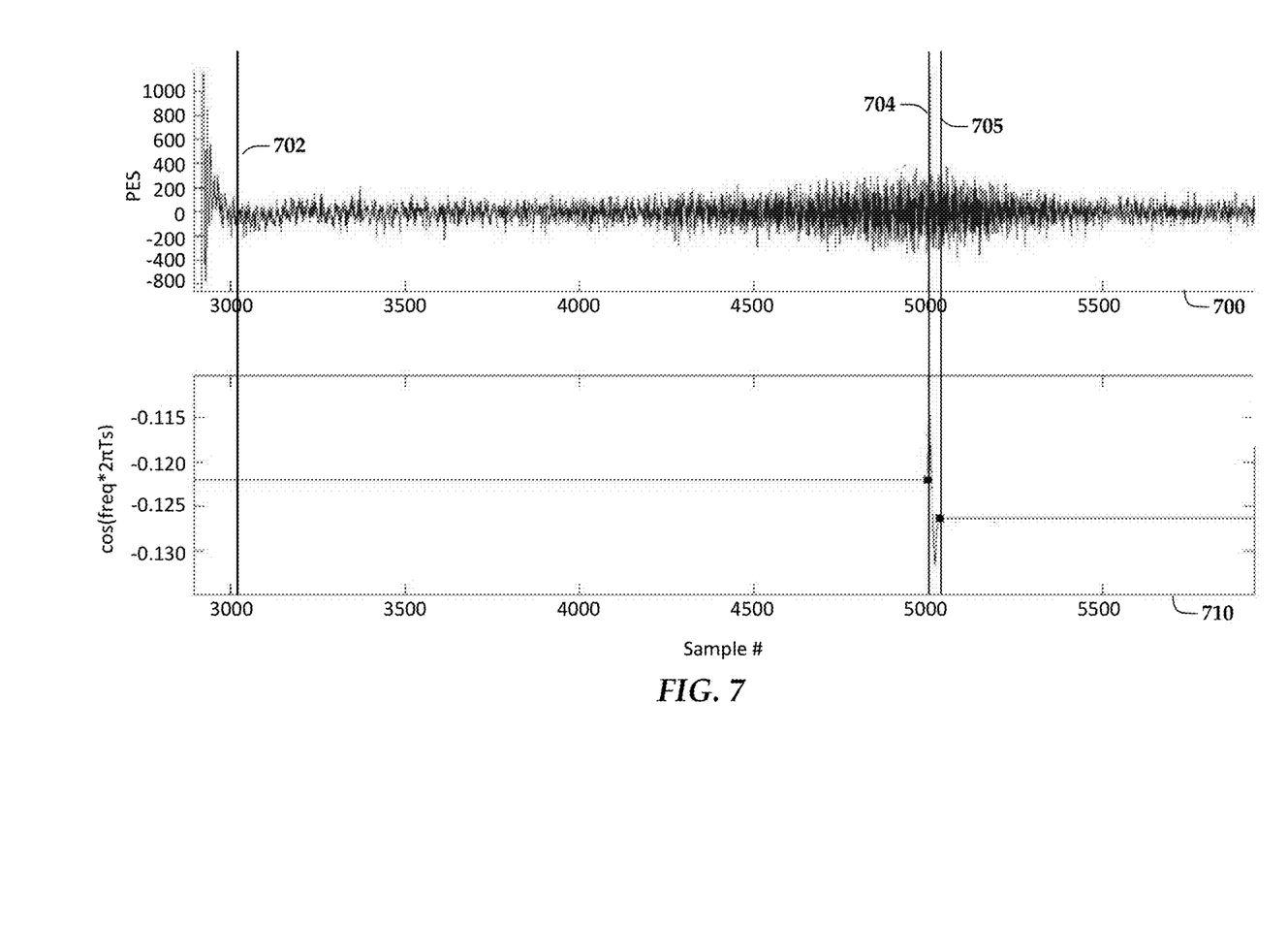
FIG. 7 is a set of graphs illustrating an adaptive notch filter in operation according to an example embodiment.

In FIG. 7, a set of graphs illustrates an adaptive notch filter in operation according to an example embodiment. The top graph 700 shows a PES signal at the beginning of a track follow mode (around the sample at time 702). At time 704, absolute magnitude of the PES hits a threshold due to a resonance that is disturbing the read/write head. Graph 710 shows the value of the reflection coefficient as it changes due the resonance triggering the adaptive notch filter. In this example, the LRLS processor adapts to the new coefficient between times 704 and 705, which corresponds to 33 samples. The processor adapts in less than 50 samples in most cases. The PES amplitude begins to decline not long after application of the adapted notch filter.

Figure 8:
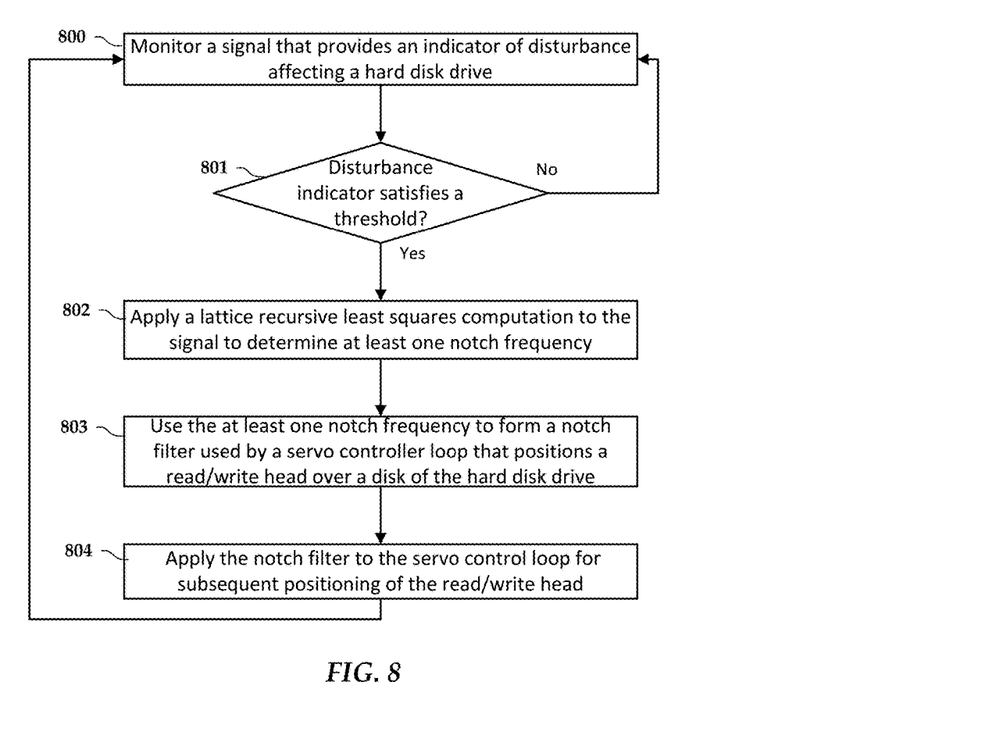
FIG. 8 is a flowchart showing a method according to example embodiments.

In FIG. 8, a flowchart illustrates a method according to an example embodiment. The method involves monitoring 800 a signal that provides an indicator of disturbance affecting a hard disk drive. In response to determining 801 that the indicator of the disturbance satisfies a threshold, a lattice recursive least squares computation is applied to the signal to determine 802 at least one notch frequency. Using the at least one notch frequency, a notch filter used by a servo controller loop is formed 803 that positions a read/write head over a disk of the hard disk drive. The notch filter is applied 804 to the servo control loop for subsequent positioning of the read/write head . . . .

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   monitoring a signal that provides an indicator of disturbance affecting a hard disk drive, the signal being monitored during an operational track following mode of the hard disk drive;
   in response to determining that the indicator of the disturbance satisfies a threshold:
      applying a lattice recursive least squares computation to the signal to determine at least one notch frequency; and
      using the at least one notch frequency to form a notch filter used by a servo controller loop that positions a read/write head over a disk of the hard disk drive; and
      apply the notch filter to the servo control loop for subsequent positioning of the read/write head.

2. The method of claim 1, wherein the monitoring of the signal and the determining that the indicator of the disturbance satisfies the threshold is initiated during each track follow operation of the disk drive.

3. The method of claim 1, wherein the signal comprises a position error signal provided by the servo controller.

4. The method of claim 1, wherein the signal comprises a sensor signal from a vibration sensor.

5. The method of claim 1, wherein forming the notch filter comprises converting a reflection coefficient of the lattice recursive least squares computation to a 2× multi-rate coefficient.

6. The method of claim 1, further comprising performing a stability check on the at least one notch frequency before applying the notch filter.

7. The method of claim 1, further comprising applying a bandpass filter to the signal before monitoring the signal to determine the indicator of disturbance.

8. The method of claim 1, wherein the lattice least squares computation is based on a posteriori prediction errors.

9. The method of claim 1, wherein using the at least one notch frequency to form the notch filter comprises using the at least one notch frequency only if the at least one notch frequency falls within a predetermined range.

10. An apparatus comprising:
interface circuitry coupled to at least one read/write head and at least one actuator that positions the read/write head over a disk; and
a controller coupled to the interface circuitry and configured to:
monitor a signal that provides an indicator of disturbance affecting the read/write head, the signal being monitored during an operational track following mode of the apparatus;
in response to determining that the indicator of disturbance satisfies a threshold:
apply a lattice recursive least squares computation to the signal to determine at least one notch frequency; and
using the at least one notch frequency to form a notch filter used by a servo controller loop that controls the at least one actuator; and
apply the notch filter to the servo control loop for subsequent control of the actuator.

11. The apparatus of claim 10, wherein the monitoring of the signal and the determining that the indicator of the disturbance satisfies the threshold is initiated during each track follow operation of the disk drive.

12. The apparatus of claim 10, wherein the signal comprises a position error signal provided by the servo controller.

13. The apparatus of claim 10, wherein the signal comprises a sensor signal from a vibration sensor.

14. The apparatus of claim 10, wherein forming the notch filter comprises converting a reflection coefficient of the lattice recursive least squares computation to a 2× multi-rate coefficient.

15. The apparatus of claim 10, wherein the controller is further configured to perform a stability check on the at least one notch frequency before applying the notch filter.

16. The apparatus of claim 10, wherein the controller is further configured to apply a bandpass filter to the signal before monitoring the signal to determine the indicator of disturbance.

17. The apparatus of claim 10, wherein the lattice least squares computation is based on a posteriori prediction errors.

18. A method comprising:
during a track seek of a head of hard disk drive via a servo controller, monitoring a band-limited position error signal of the head to determine that a disturbance indicator has exceeded a threshold;
in response to the disturbance indicator exceeding the threshold:
applying a lattice recursive least squares computation to the signal to determine a reflection coefficient; and
adapting a notch filter applied to the servo controller based on the reflection coefficient.

19. The method of claim 18, wherein applying the lattice recursive least squares computation comprises:
determining state equations for prediction error computation;
computing partial derivative vectors of adaptation frequencies;
updating frequency parameter updates in modified recursive least squares equations;
performing a stability check of reflection coefficients; and
computing a posteriori prediction errors based on the frequency parameter updates, wherein the notch filters are based on the frequency parameter updates.

20. The method of claim 19, further comprising converting the reflection coefficients to a 2× multi-rate coefficient.

* * * * *